United States Patent [19]

White

[11] Patent Number: 4,517,341

[45] Date of Patent: May 14, 1985

[54] PROCESS FOR PREPARING POLYPHENYLENE OXIDE-RUBBER GRAFT COPOLYMERS AND PRODUCTS OBTAINED THEREBY

[75] Inventor: Dwain M. White, Schenectady, N.Y.

[73] Assignee: General Electric Company, Schenectady, N.Y.

[21] Appl. No.: 544,341

[22] Filed: Oct. 24, 1983

Related U.S. Application Data

[63] Continuation-in-part of Ser. No. 402,398, Jul. 27, 1982, abandoned.

[51] Int. Cl.³ .............................................. C08F 8/00
[52] U.S. Cl. .................................... 525/152; 523/332; 525/390
[58] Field of Search ................. 525/152, 390; 523/332

[56] References Cited

U.S. PATENT DOCUMENTS

| | | | |
|---|---|---|---|
| 3,257,357 | 6/1966 | Stamatoff | 525/215 |
| 3,257,358 | 6/1966 | Stamatoff | 525/215 |
| 3,306,875 | 2/1967 | Hay | 525/215 |
| 3,522,326 | 7/1970 | Bostick et al. | 525/391 |
| 4,054,553 | 10/1977 | Olander | 528/215 |
| 4,092,294 | 5/1978 | Bennett et al. | 528/215 |
| 4,152,316 | 5/1979 | Cooper et al. | 524/141 |
| 4,427,814 | 1/1984 | Sugio et al. | 525/152 |

Primary Examiner—Jacob Ziegler
Attorney, Agent, or Firm—William H. Pittman; James C. Davis, Jr.; James Magee, Jr.

[57] ABSTRACT

By synthesizing a polyphenylene oxide using a catalyst comprising a primary or secondary amine and/or a manganese compound, the same can be grafted to an unsaturated compound such as an unsaturated rubber at high yield. A process for so modifying an unsaturated compound such as an unsaturated rubber and the product obtained thereby are disclosed.

16 Claims, No Drawings

PROCESS FOR PREPARING POLYPHENYLENE OXIDE-RUBBER GRAFT COPOLYMERS AND PRODUCTS OBTAINED THEREBY

This application is a continuation-in-part of copending application Ser. No. 402,398, filed July 27, 1982, now abandoned.

BACKGROUND OF THE INVENTION

The present invention relates to a process for modifying unsaturated compounds such as unsaturated rubbers by grafting a polyphenylene oxide thereon, the polyphenylene oxide having been synthesized using a catalyst comprising a primary or secondary amine and/or a manganese compound, and products obtained by said process.

DESCRIPTION OF THE PRIOR ART

Self-condensation reactions of certain phenols employing oxygen in combination with an effective oxidative coupling catalyst system to form monofunctional polyphenylene oxides are well known in the prior art, such polyphenylene oxides typically having an average hydroxyl group per molecule of 1.0 or less. See, e.g., U.S. Pat. Nos. 3,306,875; 3,914,266; and 4,028,341 Hay and U.S. Pat. Nos. 3,956,442; 3,965,069; 3,972,851 and 4,054,553 Olander.

In more detail, U.S. Pat. No. 3,306,874 Hay discloses the preparation of self-condensation products of aromatic compounds containing a hydroxy group directly bonded to an aromatic nucleus which comprises reacting such compounds with oxygen in the presence of a dissolved oxygen-carrying intermediate comprising an aliphatic amine-basic cupric salt complex where the amine has at least one hydrogen on the amine nitrogen and products formed thereby. Per the teaching of this patent, however, "the amine does not become an integral part of the reaction product", through recent analyses have shown secondary amines in the catalyst are chemically bound to the polyphenylene oxide, approximately one amino group per polyphenylene oxide molecule.

U.S. Pat. Nos. 3,929,930 and 3,929,931 Izawa et al disclose grafting polystyrene onto an oligophenylene ether using a radical initiator such as an organic peroxide. Since the grafting disclosed in these two patents results from a chemical treatment of a polyphenylene oxide with a peroxide, presumably the peroxide reacts with the polyphenylene oxide to form a reactive site to which styrene can be grafted. Per the present invention, of course, a different functional group in the polyphenylene oxide is used which is present from the time the polyphenylene oxide is made, whereupon grafting to rubber (not styrene monomer) at high temperature can be effected.

U.S. Pat. No. 4,054,553 Olander discloses forming self condensation products of a phenol under polymer forming reaction conditions to yield a polyphenylene oxide using a mixed manganese chelate complex in the presence of a secondary amine.

U.S. Pat. No. 4,129,555 White discloses a process of forming self-condensation products of an aminophenol and another phenol under polymer forming reaction conditions which comprises contacting an aminophenol and another phenol with oxygen in the presence of an effective oxidative coupling catalyst system.

SUMMARY OF THE INVENTION

It has been discovered that certain polyphenylene oxides can be grafted to unsaturated compounds such as unsaturated rubbers when heated in the molten state if the polyphenylene oxides have been synthesized with a catalyst comprising a primary or secondary amine and/or manganese.

Accordingly, the present invention is directed to a process for producing a polyphenylene oxide-rubber graft copolymer and the product produced thereby, said process comprising the steps of:

(A) forming a polyphenylene oxide by oxidative coupling of at least one phenol in the presence of a system which includes at least one compound selected from the group consisting of manganese compounds and primary and secondary amines, said compound producing grafting sites on said polyphenylene oxide;

(B) intimately contacting said polyphenylene oxide with an unsaturated compound; and subsequently (C) heating the resulting blend at a temperature and pressure and for a time sufficient to form said graft copolymer.

DESCRIPTION OF THE PREFERRED EMBODIMENTS

In general, it is to be noted that the interaction of polyphenylene oxide with an unsaturated compound as per the present invention differs in several respects from the prior art.

Firstly, chemically bound amine (up to one per molecule) or an equivalently reactive moiety, possibly an aryloxy, methoxy or hydroxy group is required for the reaction (possibly generation of a quinone methide intermediate).

Secondary, unsaturated groups in the unsaturated compound, or, to a lesser extent, aryl groups, are required.

Thirdly, low concentrations of polyphenylene oxide in the unsaturated compound give more grafting of polyphenylene oxide to unsaturated compound than high concentrations.

Polyphenylene oxides useful in the present invention include those of the type disclosed, together with methods for their preparation, in U.S. Pat. No. 3,306,874 Hay, U.S. Pat. No. 4,054,553 Olander and U.S. Pat. No. 4,129,555 White.

It will be appreciated by one skilled in the art, of course, that per the present invention a catalyst comprising a primary or secondary amine and/or manganese is utilized to form such polyphenylene oxide and grafting sites produced by said amine and/or manganese are present as an integral part of the resulting polyphenylene oxide. Accordingly, the immediate following discussion of exemplary polyphenylene oxides useful in the grafting procedure of the present invention is merely in the context of the polyphenylene oxide structure which is formed, with later discussion being directed to incorporation of the primary or secondary amine and/or manganese.

Thus, using starting materials as described in U.S. Pat. No. 3,306,874 Hay, polyphenylene oxides having a molecular structure represented by the formula:

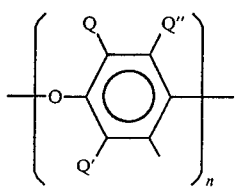

can be used with success herein wherein Q is a monovalent substituent selected from the group consisting of hydrocarbon radicals free of a tertiary α-carbon, hydrocarbonoxy radicals free of a tertiary α-carbon atom, haloaryl radicals wherein all halogens are substituted on aromatic carbon atoms, and haloaryloxy radicals wherein all halogens are substituted on aromatic carbon atoms, Q' is the same as Q and in addition halogen, and Q" is the same as Q and in addition hydrogen and halogen, with the proviso that X must be halogen when Q and Q' are each a member of the group consisting of aryl radicals, haloaryl radicals, hydrocarbonoxy radicals and haloaryloxy radicals, both Q and Q' cannot be aryl at the same time, and n is an integer of indeterminate value since the resinous products are mixtures of different chain lengths and the ordinary means of determining molecular weights give an average value. For those materials of low molecular weight, n is an average of 10 to 15 while for the high molecular weight resins having film and fiber forming properties it is 100 to 1,500 or greater.

In a similar fashion, following the teaching of U.S. Pat. No. 4,045,553 Olander, by the reaction of oxygen with a phenol having the structural formula:

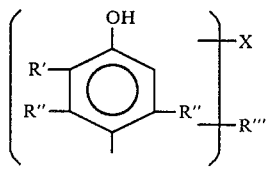

where X is a substituent selected from the group consisting of hydrogen, chlorine, bromine, and iodine; R' is a monovalent substituent selected from the group consisting of hydrocarbon radicals, halohydrocarbon radicals having at least two carbon atoms between the halogen atoms and a phenol nucleus, hydrocarbonoxy radicals, and halohydrocarbonoxy radicals having at least two carbon atoms between the halogen atoms and a phenol nucleus, R" and R''' being the same as R' and, in addition, halogen, one obtains the corresponding polyphenylene oxides.

Finally, with reference to U.S. Pat. No. 4,129,555 White, involving the reaction of an aminophenol and another phenol, aminophenols of the formula below can be reacted with an "another phenol" of the formula below to prepare the corresponding polyphenylene oxides.

Aminophenol reactants include those of the following formula:

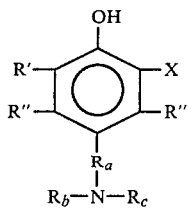

wherein X is hydrogen, chlorine, bromine, or iodine, R' is hydrogen, a hydrocarbon radical, a halohydrocarbon radical having at least 2 carbon atoms between the halogen atoms and a phenol nucleus, a hydrocarbonoxy radical, or a halohydrocarbonoxy radical having at least two carbon atoms between the halogen atoms and a phenol nucleus, R" being the same as R' and, in addition, halogen, $R_a$ being methylene or a substituted methylene hydrocarbon group, including saturated and unsaturated, branched and unbranched, acyclic and cyclic, aromatic and aliphatic hydrocarbon groups, $R_b$ and $R_c$ being acyclic or cyclic—including combinations of $R_b$ and $R_c$ to form a cyclic ring structure(s)—saturated or unsaturated hydrocarbon groups, subject to the proviso that $R_b$ and $R_c$ either alone or in combination do not constitute an aromatic ring structure having an aromatic ring carbon atom directly bonded to the nitrogen atom of the amino group and further subject to the proviso that at least one of $R_b$ and $R_c$ is a hydrocarbon group. Preferably $R_a$ is a divalent alkylene radical, $R_b$ is hydrogen or a primary or secondary alkyl radical, and $R_c$ is a primary or secondary alkyl radical. In a presently preferred embodiment $R_a$ is methylene and $R_b$ and $R_c$ are $C_{1-15}$ primary or secondary alkyl radicals. Generally illustratively, the $R_a$ group can be methylene, ethylidene, isopropylidene, cyclopentylidene, benzylidene, 2,4-cyclohexadienylidene, etc., and the $R_b$ and $R_c$ group(s) or combinations thereof are methyl, ethyl, normal propyl, isopropyl, secondary butyl, tertiary butyl, normal hexyl, cyclohexyl, dodecyl, eicosyl, triacontyl, etc.

The "another phenol" can be any of the phenols employed in any of the prior art processes for the preparation of polyphenylene oxides. Among the phenols of the prior art defined herein as "another phenol" are those of the following structural formula:

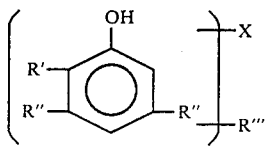

X, R' and R" are the same as defined hereinbefore with respect to the aminophenol, R''' being the same as R' and in addition, a halogen.

The unsaturated compound(s) onto which the polyphenylene oxide(s) of the present invention is grated is not particularly limited so long as the unsaturated compound(s) contains double bonds, i.e., saturated compounds are not useful in the present invention.

The number of double bonds present per repeating unit in the unsaturated compound used herein is not particularly limited, but it is generally preferred that there be at least an average of about 0.1 unsaturated bond per repeating unit, and it is most preferred that there be an average of at least 0.3 unsaturated bonds per repeating unit. As one skilled in the art will appreciate, the maximum number of unsaturated bonds per repeating unit is not limited in any fashion, but typically most commercially available unsaturated compounds contain no more than about one unsaturated bond per repeating unit.

Examples of useful unsaturated compounds include unsaturated rubbers such as natural rubber (which is of the polyisoprene type), polyisoprene rubbers, polybutadiene rubbers and styrene-butadiene rubbers. Aliphatic rubbers (e.g., natural, polyisoprene and polybutadiene rubber) are preferred. Especially preferred are rubbers which are free from any substantial amount of crosslinking. This condition is, for the most part, accompanied by substantial solubility in aromatic liquids such as benzene and toluene, in chlorinated aliphatic liquids such as methylene chloride and chloroform, and in other liquids of relatively low polarity. Thus, rubber-modified polystyrenes and similar materials which form gels when contacted with such liquids are not among the preferred unsaturated compounds for the purposes of this invention.

Other useful unsaturated compounds include those which are not unsaturated rubbers but which can be grafted to polyphenylene oxide because of their unsaturation, e.g., poly-trans-1,4-butadiene, polyacetylenes such as polyphenyl acetylenes, and the like.

Polystyrene with pendant vinyl groups may also be used. Polystyrene itself has aryl rings that could be considered unsaturated; however, since they are aromatic they are less reactive. Thus, while polystyrene may also be used instead of the above unsaturated compounds or in combination therewith, with polystyrene the amount of grafting noted is generally less than with the recited unsaturated rubbers and such is not preferred in the present invention.

The unsaturated compound(s) used per the present invention are formed in a conventional fashion as will be apparent to one skilled in the art, i.e., no special modification of commercially available unsaturated compound is needed for the same to be used with success in the present invention.

The amount of polyphenylene oxide and unsaturated compound(s) in the blend theeof can be relatively freely varied, noting that if polyphenylene oxide is present in relatively low amounts the proportion of polyphenylene oxide grafted onto the unsaturated compound will be greater than if the polyphenylene oxide is present in larger amounts. While not meant to be limitative, generally 100 parts by weight of said blend contains about 5 to about 80 parts by weight of polyphenylene oxide and about 95 to about 20 parts by weight of unsaturated compound, more preferably 10 to 50 parts of polyphenylene oxide and 90 to 50 parts of unsaturated compound.

At present, it does not appear that there is any particular special limit on the molecular weight of polyphenylene oxide used with success in the present invention. The most important criterion that a polyphenylene oxide must exhibit is to have sufficient reaction during the polymerization, i.e., exhibit a sufficiently high molecular weight to have incorporated one amine group per polyphenylene oxide molecule.

However, generally I prefer to use polyphenylene oxides having a relatively high molecular weight, for examples, on the order of about 5,000 to about 50,000 (number average molecular weight), more preferably from 10,000 to 30,000 (number average molecular weight).

In a similar fashion, the molecular weight of the unsaturated compound(s) onto which the polyphenylene oxide of the present invention is grafted is not overly important. However, I believe that better results will be obtained using unsaturated compound(s), especially rubbers, having number average molecular weights from 5,000 to 1,000,000.

As will be apparent to one skilled in the art, it is possible to use one or more unsaturated compounds, most especially one or more unsaturated rubbers, in combination with one or more polyphenylene oxides.

As indicated, the polyphenylene oxide used per the present invention can be prepared according to the disclosures of the above-indicated patents by Hay, Olander and White. These disclosures are incorporated by reference herein, and reference thereto should be made for a detailed discussion of starting materials, catalysts used, reaction systems used, reaction conditions and the like.

It is mandatory, per the present invention, that the polyphenylene oxide used herein be prepared using a catalyst comprising a primary or secondary amine and/or a manganese compound. Said amine and/or functional groups imparted by said manganese compound constitute grafting sites on said polyphenylene oxide and must be retained as an integral portion thereof prior to grafting onto the unsaturated compound. A polyphenylene oxide prepared in a similar fashion without using said amine and/or said manganese compound will not undergo extensive grafting as per the present invention.

In this regard, the presence of said amine provides improved grafting as compared to the situation where said amine is omitted, i.e., where only the manganese compound is present.

For example, if a polyphenylene oxide is prepared using a copper catalyst, the catalyst should comprise a primary or secondary amine as in this instance the copper catalyst alone will not produce the active site to provide the preferred grafting degree desired herein.

On the other hand, polyphenylene oxides prepared with a manganese chloride-benzoin oxime catalyst will graft to some extent even if said amine is omitted, but will also show improved grafting if said amine is present during the formation of the polyphenylene oxide. It appears that a certain amount of reactive sites similar to those formed with said amine are also formed using a manganese chloride-benzoin oxime catalyst.

Given the improved grafting results obtained using said amine as a catalyst component, it is thus most preferred to use a primary or secondary amine/manganese containing catalyst, since in this instance both the amine and manganese will contribute to the grafting effect.

Since primary or secondary amines as a catalyst component are preferred, hereafter the following discussion will largely be with reference to such amine-containing catalyst systems.

Generally, the catalysts of the present invention will comprise a primary catalyst component and an amine component.

The primary catalyst component utilized is not especially limited and includes those disclosed in the aforementioned U.S. Pat. No. 3,306,874 Hay, U.S. Pat. No. 4,054,443 Olander and U.S. Pat. No. 4,129,555 White, as well as U.S. Pat. No. 3,639,656 Bennett et al., the disclosure of which is also incorporated by reference herein.

Thus, exemplary of such primary catalysts are the copper salt based catalysts disclosed in the above Hay patent and the manganese (II) oxime chelate catalyst disclosed in the above Olander patent.

The amounts of primary catalyst used herein are as defined in the above pants to Hay, Olander, White and Bennett et al.

The amount of primary or secondary amine can be freely varied so long as sufficient amine is present in the polyphenylene oxide and bound chemically thereto to provide the desired number of reactive sites.

Usually one or more amines is/are used in an amount of at least about 0.002 mole per mole of monomer present in the reaction system, more preferably in an amount of 0.005 mole to 0.02 mole per mole of monomer present in the reaction system.

It is most preferred that the amine be present in the catalyst system used to form the polyphenylene oxide so as to provide at least one amine group bound chemically per one polyphenylene oxide molecule.

There does not appear, at present to be any particular critical limitations on the identity of the amine utilized. However, it is mandatory, as earlier indicated, that the amine be present in the reaction mixture used to form the polyphenylene oxide per the present invention and the amine be chemically bound to the polyphenylene oxide prior to grafting per the present invention. During the grafting procedure, of course, the amine is stripped from the polyphenylene oxide to provide a reactive site which will react with the unsaturated compound and provide the desired graft copolymer.

Certain background factors should be kept in mind in selecting the amine, however.

Firstly, extremely bulky amines may be difficult to incorporate in the polyphenylene oxide due to steric hinderance. For example, N,N-di(t-butyl)amine is difficult to incorporate in large quantities into the polyphenylene oxide.

Additionally, aromatic amines are quite often easily oxidized during formation of the polyphenylene oxide, and generally these will not be preferred for use in the present invention unless critical control of reaction parameters can be exercised.

Balancing all of the above factors, a highly preferred class of amines for use in the present invention are those represented by the formula:

R—NH—R' wherein R is linear alkyl, branched alkyl, aralkyl or heteroalkyl; R' is the same as R or hydrogen; and wherein R and R' can combine to yield cycloalkyl, cycloaralkyl or cycloheteroalkyl.

Of the above amines, most preferred amines include dibenzylamine, ethylamine, dimethylamine, methylethylamine, butylamine, diethylamine, methylpropylamine, propylamine, dipropylamine, ethoxyethylmethylamine, dibutylamine, di-isopropylamine, dicyclohexylamine, morpholine, piperazine, piperidine, etc., and a currently most preferred amine for use in the present invention is dibutylamine.

Having thus described the essential components reacted per the present invention, the following discussion deals with process conditions. Since it is most preferred to use one or more unsaturated rubbers as the unsaturated compounds per the present invention, hereafter the discussion will be in terms of such unsaturated rubbers. I believe the following discussion regarding process conditions applies with equal force to other unsaturated compounds and the following discussion should be so read.

Process Conditions

The first essential process step per the present invention is to bring the polyphenylene oxide containing the amine and the unsaturated rubber into intimate contact. While this can be accomplished in a number of ways, typically the polyphenylene oxide and unsaturated rubber are dissolved in an appropriate solvent for both materials, for example, chloroform and benzene, followed by solvent removal. Alternatively, dry blending can be used. However, it is essential that the blending method be chosen so as to provide a blend which is much more intimate than that produced by known methods of extrusion of the polymer mixture. Extrusion will seldom produce a blend intimate enough for this invention. In most instances, the solution methods, with or without co-precipitation as described hereinafter, are preferred.

While the exact solvent selected will depend upon the exact polyphenylene oxide and unsaturated rubber being used, such can easily be determined by one skilled in the art. Useful solvents include, for example, aromatic solvents such as benzene, toluene, xylene, chlorobenzene and the like, haloalkanes such as chloroform, trichloroethane, trichloroethylene and the like, cyclic ethers such as tetrahydrofuran, dioxane and the like, compounds such as carbon disulfide, etc.

The amount of polyphenylene oxide and unsaturated rubber dissolved in the solvent is not overly important, but for ease of processing usually the total amount of polyphenylene oxide and unsaturated rubber is from about 5 to about 15 parts based on 100 parts by weight of the solvent.

After the dissolution is effected, the resulting intimate mixture of polyphenylene oxide and unsaturated rubber is typically co-precipitated into an appropriate non-solvent therefor, such as methanol, and then washed and dried.

The co-precipitation liquid is not limited to methanol, of course, and other co-precipitation liquids such as lower hydrocarbons, e.g., pentane, hexane, heptane and the like, lower ketones such as acetone, methyl ethyl ketone and the like, alcohols such as ethanol and propanol and the like, nitroalkanes such as nitromethane, nitroethane and the like, nitriles such as acetonitrile, propionitrile and the like, ethers such as tetrahydrofuran, water, and dilute acids can be used with success, if the liquid is miscible with water.

One skilled in the art will easily be able to determine appropriate solvents and co-precipitation liquids for any particular polyphenylene oxide/unsaturated rubber system.

It is important, in the above procedure, that the polyphenylene oxide be maintained at a temperature substantially below its glass transition temperature at all times prior to grafting per the present invention. I have discovered that if the polyphenylene oxide has been heated to a temperature close to its glass transition temperature, for example, to a temperature about 10° C. lower than the glass transition temperature or higher, grafting is substantially reduced.

For reasons which are not entirely clear, preheating the polyphenylene oxide prior to the grafting procedure of the present invention drastically decreases the reactivity of the polyphenylene oxide; however, I believe that this is due to activating reactive sites in the polyphenylene oxide, causing the same to graft to polyphenylene oxide.

It is most preferred per the present invention to effect grafting in a mold at elevated pressure using a temperature close to or in excess of the glass transition temperature of the polyphenylene oxide.

The exact pressure selected is not overly important so long as proper plastic flow results during the molding. For commercial grade products, of course, the pressure should be sufficient to ensure that bubbles and streaks are removed from the system. For example, pressures on the order of about 1,000 psig to about 20,000 psig can be used with success, more preferably from 2,000 to 10,000 psig.

In a similar fashion, temperature can be relatively freely selected so long as the secondary amine is liberated from the polyphenylene oxide to provide the desired reactive intermediate which will react with the unsaturated rubber. Generally, temperatures along the line of about 250° C. to about 350° C., more preferably 270° to 330° C., are used.

Finally, the time of molding (curing) is relatively unimportant since the grafting reaction proceeds very rapidly. Usually times on the order of about 0.5 minute to about five minutes can be used with success, more preferably 1 to 2 minutes.

In order that those skilled in the art may better understand my invention, the following Examples are given which are illustrative of the currently preferred best modes of practicing the invention. All parts are by weight unless otherwise stated.

GENERAL PROCEDURE

The polyphenylene oxide materials used were prepared following the procedure of Example 7 of U.S. Pat. No. 4,092,294 Bennett (copper/diamine), Example 1 of U.S. Pat. No. 3,661,848 Cooper (copper/dibutylamine) when hydrolytically stable catalysts were used and by Procedure A of U.S. Pat. No. 4,129,555 White when manganese/benzoin oxime catalysts were used. The disclosures of these Bennett and Cooper patents are incorporated by reference herein.

In the Run using a catalyst per procedure A of U.S. Pat. No. 4,129,555 White, in addition to the 2,6-dimethylphenol in the reaction mixture 1 mole percent of 3,5-dimethyl-4-(N,N-diethylaminomethyl)phenol was used as a comonomer.

The polyphenylene oxides obtained had the number average molecular weights and contained amine unit(s) per polyphenylene oxide molecule as indicated in the following Table where DBA means dibutylamine, DMBA means dimethylbutylamine and the diamine was N,N'di-t-butyl-1,1,2-ethylene diamine.

TABLE I

| Catalyst | Polyphenylene Oxide | No. Avg. Molec. Wt. | No. of Amine Units Per Molecule |
|---|---|---|---|
| Cu/DBA | U.S. Pat. No. 3,661,848 | 20,000 | ca. 2.0 |
| Cu/diamine + DBA + DMBA | U.S. Pat. No. 4,092,294 | 15,000 | ca. 0.8 |
| Mn/DBA | U.S. Pat. No. 4,129,555 | 15,000 | ca. 0.7 |

The unsaturated rubbers were commercially obtained. The styrene-butadiene (SBR) was a random copolymer composed of 5% styrene and 95% butadiene obtained from Cellomer Associates, had a number average molecular weight of 65,000 (PS calibration) and contained one double bond per repeating butadiene unit and the syndiotactic-1,2-polybutadiene (PBD) was obtained from JSR America, was 92% syndiotactic and had a number average molecular weight of 121,000 (PS calibration). Polystyrene (PS) was also used and was obtained from Dow Chemical Company under the tradename PS-3 Styron ®MW 33000. The polystyrene was atactic and had a number average molecular weight of 45,000.

Polyphenylene Oxide/Rubber Grafting

The procedure used to graft the polyphenylene oxide on SBR and PBD was identical, and accordingly both are referred to merely as "rubber".

Standard solutions of rubber and polyphenylene oxide were formed by dissolving 5 g of rubber in 50 ml of chloroform and 5 g of poly(2,6-dimethyl-1,4-phenylene oxide) in 50 ml of chloroform. The rubber solution was filtered to remove any rubber that was insoluble in chloroform.

Desired portions of the rubber solution and the polyphenylene oxide solution were then combined to give a composition as indicated in the Table below (for PPO and SBR) and then 10 ml of the desired composition was added to 100 ml of vigorously stirred methanol to form chopped strands of the blend. For brevity, hereafter polyphenylene oxide is often abbreviated PPO.

The resulting blends were then dried at 50° C. to constant weight, and portions of the blends were analyzed by NMR to confirm the composition thereof.

TABLE II

| Ml of PPO Solution | Ml of SBR Solution | Composition of Precipitated Blend (wt. %) | |
|---|---|---|---|
| | | PPO | SBR |
| 9.0 | 1.0 | 92.8 | 7.2 |
| 7.5 | 2.5 | 81.1 | 18.9 |
| 2.5 | 7.5 | 32.3 | 67.7 |
| 1.0 | 9.0 | 13.7 | 86.3 |

The blends were then pressed (in an amount slightly less than 1 g per sample) in a Carver press between Teflon coated aluminum sheets which were between two ferrotype plates. The blend samples were placed between preheated platens and allowed to come to temperature over a 30 second period. Thereafter, pressure (5,000 psig) was applied and after 2 minutes at the desired temperature (270° or 280° C.) the sample was removed and cooled rapidly to 25° C. It is to be noted in this regard that the cooling rate is not critical as once the temperature drops below 200° C. the sample rapidly cools below 200° C. simply by removing the same from the press and the plates.

The resulting flexible films of a thickness of 5-10 mils were then weighed and then extracted in a stirred chloroform vat at 25° C. The chloroform was replaced with fresh chloroform at intervals of 3 hours.

After overnight extraction, the extracted films were dried and weighed.

Control samples of re-precipitated rubber, i.e., the rubber was dissolved in chloroform and precipitated with methanol before pressing without polyphenylene oxide addition, and blends of the SBR and PBD with polyphenylene oxide were also pressed into films under identical conditions to determine the percentage of gelation in the rubber. The SBR control sample which had been processed at 270° C. for 2 minutes at 5,000 psig contained 85% insoluble gel and the PBD control sample which had been processed at 270° C. for 2 minutes at 5,000 psig contained 81% insoluble gel.

EXAMPLE I

Polyphenylene Oxide/Rubber Grafting

A blend of PPO from U.S. Pat. No. 3,661,848—Cooper, (Example 1; contains 2000 ppm bound nitrogen, [η] 0.51 dl/g) and SBR was prepared by adding a solution of 5.0 g PPO in 50 ml chloroform and 5.0 g SBR in chloroform (filtered to remove insoluble SBR) to a liter of methanol in a mechanical blender. The precipitate was dried in a vacuum oven at 80° C. NMR analysis showed 58±2% PPO and 42±2% SBR, by weight. A portion was compression molded at 270° C. (0.5 min. preheat, 2 min. at 5000 psig) to produce a translucent film 0.006" thick. The film was extracted exhaustively with chloroform and then dried.

From the weight of the extracted film and correcting for 15% of the SBR being soluble after heating at 270°, the gelled film still contained 41% of the total PPO. The presence of PPO in the gel was confirmed by measurement of the IR spectrum and by proton-NMR spectroscopy of a deuterochloroform swelled sample.

Polyphenylene oxides do not form a gel when heated at 270° C. whereas unsaturated rubbers do. Since there was too much gel to be due to the rubber alone, some polyphenylene oxide was thus also present in the gel. For polyphenylene oxide to be in the gel, it had to be chemically bound to the rubber, i.e., grafted. Any ungrafted polyphenylene oxide was dissolved from the gel.

Thus, for example, if an unsaturated rubber is heated alone at 270° C., a crosslinked gel results. On the other had, when heating a polyphenylene oxide alone at the same temperature, while molecular weight increases, there is no gelation. Finally, when heating a polyphenylene oxide and a rubber in combination at the same temperature, a crosslinked gel results having a greater weight than if rubber alone is present. The gel will contain polyphenylene oxide if the polyphenylene oxide has reactive sites. If the polyphenylene oxide does not have reactive sites, there will be no polyphenylene oxide in the gel.

The quantity of polyphenylene oxide in the extracted films was determined by the weight difference of the films before and after extraction (after correcting for the soluble rubber fraction), and the presence of polyphenylene oxide in the films was also confirmed qualitatively by IR and semi-quantitatively by broadline NMR studies on deuterochloroform swollen gels.

Polyphenylene Oxide-Polystyrene Grafting

Polyphenylene oxide (obtained per Example 1 of U.S. Pat. No. 3,661,848 and as used above in Example 1) in an amount of 1.5 g and polystyrene in an amount of 3.5 g were dissolved in 60 ml of benzene and then precipitated by addition of 400 ml of vigorously stirred methanol.

The resulting sample weight 4.9 g and contained 32% (w/w) polyphenylene oxide by NMR analysis.

1.1 g of the blend was then compression molded into a film 5–10 mils thick as earlier described (30 second preheat at 270° C.; then 270° C. for 2 minutes at 5,000 psig) between Teflon coated aluminum plates to obtain Sample I.

A second portion of the blend was cast from the benzene solution onto a flat glass surface and the solvent was allowed to evaporate to form a film 5–10 mils thick and yield Sample II.

Each Sample was dissolved in methylene chloride (ca. 25 ml/g), and, when a polyphenylene oxide-methylene chloride complex began to form, the mixture was cooled to 0° C.

After 24 hours the crystals formed were filtered off, washed with methylene chloride and dried. NMR analysis showed the presence of polystyrene in the fraction from Sample I but none in the fraction from Sample II. The results are summarized in the Table below where polystyrene is abbreviated PS.

TABLE III

Polystyrene-Polyphenylene oxide Interaction Determination by Methylene Chloride Fractionation

| | Sample | |
|---|---|---|
| | Pressed Film (graft) | Cast Film (blend) |
| Yield of dried polyphenylene oxide complex[a] | 107% | 98% |
| Composition of dried polyphenylene oxide complex (mole %)[b] | 89% PPO 11% PS | 100% PPO 0% PS |
| Composition of polystyrene (soluble) fraction | 99 + % PS ca. 0.4% PPO | 100% PS 0% PPO |

[a]Based on initial polyphenylene oxide content; a mechanical loss of ca. 2% was experienced in the isolation of the complexes.
[b]Measured by IR spectroscopy (at 857 cm$^{-1}$ for PPO and 698 cm$^{-1}$ for PS) and by NMR spectroscopy.

This separation demonstrates that the polyphenylene oxide fractionated from the heated blend contained 10% (w/w) polystyrene, whereas in the unheated blend more normal behavior was exhibited, that is, no polystyrene was in the polyphenylene oxide fraction. Grafting between polyphenylene oxide and polystyrene accounts for the retention of the polystyrene in the complex. Any low molecular weight polyphenylene oxide that was grafted to high molecular weight polystyrene produced a graft copolymer too low in polyphenylene oxide content to form an insoluble complex with methylene chloride and resulted in a small amount of PPO in the soluble fraction.

EXAMPLE II

Following the procedure of Example I and using polyphenylene oxide, SBR and PBD as described for Example 1, polyphenylene oxide was grafted onto SBR and PBO while varying the percentage of polyphenylene oxide in the blend.

The results set forth in the Table below were obtained for reaction temperatures (in the case of PBD) of 270° and 280°.

TABLE IV

| | % of Total Polyphenylene Oxide Grafted to Gelled Rubber | | |
|---|---|---|---|
| | | PBD | |
| Wt % PPO in Blend | SBR | 270° | 280° |
| 93 | 6 | — | — |
| 81 | 15 | — | — |
| 50 | 47 | 29 | 33 |
| 40 | — | 40 | 45 |
| 32 | 76 | — | — |
| 30 | — | 54 | 77 |

TABLE IV-continued

| Wt % PPO in Blend | SBR | % of Total Polyphenylene Oxide Grafted to Gelled Rubber PBD | |
|---|---|---|---|
| | | 270° | 280° |
| 20 | — | 80 | 97 |

Not only is the amount of grafting found to vary with temperature and type of rubber, but also with the ratio of PPO to rubber. The results indicate that there is a competition between an activated PPO molecule to combine either with another PPO molecule or with a rubber molecule. At low PPO concentrations grafting to rubber is the major process.

EXAMPLE III

Following the procedure of Example I, polyphenylene oxides as described below and SBR as was used in Example I were grafted as described in Example I. The results are set forth in the Table below.

Samples A to G were formed as follows:

Samples A and B (before heating: bound N, 2000 ppm; $[\eta]$ 0.51 dl/g) per Example 1 of U.S. Pat. No. 3,661,848;

Samples C (bound N, 811 ppm; $[\eta]$ 0.61 dl/g), D (bound N, 828 ppm; $[\eta]$ 0.61 dl/g) and E per Example 7 of U.S. Pat. No. 4,092,294;

Sample F (bound N, 215 ppm; $[\eta]$ 0.56 dl/g) was the same as the control for procedure A of U.S. Pat. No. 4,129,555 and Sample G (bound N, 1110 ppm; $[\eta]$ 0.50 dl/g) was formed per procedure A of U.S. Pat. No. 4,129,555.

For Samples C and D, the quantity of DBA was 1% by weight of the weight of the monomer. For Example G the quantity of co-monomer was 1 mole % of the total monomer.

TABLE V

Polyphenylene oxide-SBR (1:1 w/w) Reaction at 270° (2 min)

| Sample | PPO | % of Initial PPO Grafted to Gelled SBR |
|---|---|---|
| A | Made with Cu/DBA* catalyst | 47 |
| B | Same as A except preheated to 270° before blending | 9 |
| C | Made with Cu/diamine + DBA Catalyst; isolated by methanol ppt'n | 31 |
| D | Same as C except isolated by steam ppt'n | 28 |
| E | Same as C execpt without DBA in the catalyst | 0 |
| F | Made with Mn/benzoin oxime catalyst | 34 |
| G | Same as E but with [structure: HO-C6H3(CH2NEt2)-] as a comonomer | 53 |

*DBA = dibutylamine

These data indicate that polyphenylene oxide only grafts well with an unsaturated rubber such as SBR if the polyphenylene oxide has not been previously heated to temperatures near 270° C.

While the invention has been described in detail and with reference to specific embodiments thereof, it will be apparent to one skilled in the art that various changes and modifications can be made therein without departing from the spirit and scope of the invention.

What is claimed is:

1. A process for producing a polyphenylene oxide-rubber graft copolymer which comprises the steps of:
   (A) forming a polyphenylene oxide by oxidative coupling of at least one phenol in the presence of a catalyst which includes at least one compound selected from the group consisting of primary and secondary amines, said compound producing grafting sites on said polyphenylene oxide;
   (B) intimately contacting said polyphenylene oxide having grafting sites with at least one unsaturated rubber which is free from any substantial amount of crosslinking; and subsequently
   (C) heating the resulting blend at a temperature of about 250°-350° C. and a pressure of about 1,000-20,000 psig for a time sufficient to form said graft copolymer;
   said polyphenylene oxide being maintained at a temperature substantially below its glass transition temperature at all times prior to grafting.

2. The process of claim 1 wherein the rubber is an aliphatic rubber.

3. The process of claim 2 wherein said amine has the formula R—NH—R' wherein R is linear alkyl, branched alkyl, aralkyl or heteroalkyl, R' can be the same as R and in addition H and R and R' can combine to form a cycloalkyl, cycloaralkyl or cycloheteroalkyl group.

4. The process of claim 3 wherein said amine is selected from group consisting of ethylamine, dimethylamine, dibenzylamine, methylethylamine, butylamine, ethylpropylamine, propylamine, dipropylamine, ethoxyethylamine, dibutylamine, diisopropylamine, dicyclohexylamine, morpholine, piperazine and piperidine.

5. The process of claim 4 wherein the rubber is one which is substantially soluble in aromatic and chlorinated aliphatic solvents.

6. The process of claim 5 wherein step B is effected by dissolving said polyphenylene oxide and rubber in a solvent and said solvent is removed.

7. The process of claim 6 wherein solvent removal in step B is effected by coprecipitation of the polyphenylene oxide-rubber blend.

8. The process of claim 4 wherein the rubber is selected from the group consisting of natural rubber, polyisoprene rubbers and polybutadiene rubbers.

9. The process of claim 8 wherein 100 parts of said blend contain about 5 to about 80 parts by weight of polyphenylene oxide and about 95 to about 20 parts by weight of rubber.

10. The process of claim 9 wherein the phenol used in step A is 2,6-dimethylphenol.

11. The process of claim 9 wherein the amine is used in step A in the amount of 0.005 mol to 0.02 mol per mol of phenol.

12. A polyphenylene oxide-rubber graft copolymer produced by the process of claim 1.

13. A polyphenylene oxide-rubber graft copolymer produced by the process of claim 3.

14. A polyphenylene oxide-rubber graft copolymer produced by the process of claim 5.

15. A polyphenylene oxide-rubber graft copolymer produced by the process of claim 8.

16. A polyphenylene oxide-rubber graft copolymer produced by the process of claim 10.

* * * * *